(12) United States Patent
Nagata

(10) Patent No.: US 8,189,088 B2
(45) Date of Patent: May 29, 2012

(54) LENS APPARATUS AND CAMERA SYSTEM

(75) Inventor: Katsuhiko Nagata, Saitama (JP)

(73) Assignee: Canon Kabushiki Kaisha (JP)

( * ) Notice: Subject to any disclaimer, the term of this patent is extended or adjusted under 35 U.S.C. 154(b) by 253 days.

(21) Appl. No.: 12/717,769

(22) Filed: Mar. 4, 2010

(65) Prior Publication Data

US 2010/0309342 A1 Dec. 9, 2010

(30) Foreign Application Priority Data

Mar. 4, 2009 (JP) ................................ 2009-050005

(51) Int. Cl.
*H04N 5/225* (2006.01)
(52) U.S. Cl. ......... 348/340; 348/335; 348/360; 348/361
(58) Field of Classification Search ........................ None
See application file for complete search history.

(56) References Cited

U.S. PATENT DOCUMENTS

| | | | | |
|---|---|---|---|---|
| 6,352,378 | B1 * | 3/2002 | Izukawa | 396/529 |
| 2008/0240709 | A1 * | 10/2008 | Nakamura | 396/529 |

FOREIGN PATENT DOCUMENTS

JP 2006-135805 A 5/2006
* cited by examiner

*Primary Examiner* — Jason Chan
*Assistant Examiner* — Yih-Sien Kao
(74) *Attorney, Agent, or Firm* — Rossi, Kimms & McDowell LLP

(57) ABSTRACT

The interchangeable lens apparatus is attachable to a camera and selectively uses at least one of a plurality of accessories. The apparatus includes an aberration data memory configured to store optical aberration data for each of the plurality of accessories, an order data memory configured to store sending order data for determining a sending order of the optical aberration data to the camera, a determining means configured to determine particular optical aberration data, from the optical aberration data stored in the aberration data memory, to be sent to the camera based on information indicating which of the plurality of accessories have been selected for use and to determine the sending order of the particular aberration data based on the sending order data stored in the order data memory, and a transmitting means configured to send the particular optical aberration data, determined by the determining means, to the camera in the sending order determined by the determining means.

11 Claims, 9 Drawing Sheets

LENS APPARATUS AND CAMERA SYSTEM

BACKGROUND OF THE INVENTION

1. Field of the Invention

The present invention relates to a lens apparatus having a function of sending (transmitting) optical aberration data to a camera, and to a camera system including the lens apparatus.

2. Description of the Related Art

Various lenses including interchangeable lenses have optical aberrations such as longitudinal chromatic aberration, chromatic aberration of magnification and distortion. These optical aberrations cause deterioration of an image captured by a camera such as color blur and distortion.

Japanese Patent Laid-Open No. 2006-135805 discloses an aberration correction method in which optical aberration data of an interchangeable lens for each zoom position, each focus position and each iris (aperture stop) position are stored in a camera to which the interchangeable lens is attached and the camera performs aberration correction of an image using the optical aberration data.

However, the method disclosed in Japanese Patent Laid-Open No. 2006-135805 in which the camera stores the optical aberration data of the attached interchangeable lens requires, when a different interchangeable lens is attached to the camera, rewriting of the optical aberration data stored in the camera or adding of new optical aberration data of the different interchangeable lens to the camera by a user.

In order to eliminate such a complex data rewriting or adding process, the following method may be used. Each of plural interchangeable lenses itself stores its optical aberration data. Then, in response to power-on of a camera to which one of the interchangeable lenses is attached, the attached interchangeable lens sends its optical aberration data to the camera, and the camera stores the received optical aberration data to use it for aberration correction.

However, such a method requires transmission of a large amount of the optical aberration data from the interchangeable lens to the camera. Therefore, it takes a long time until the transmission of all the optical aberration data is completed to enable the camera to start the aberration correction. This prevents capturing of aberration-corrected images for a long time after power-on of the camera, which may miss an image capturing chance.

Moreover, a lot of interchangeable lenses can use plural accessories such as a wide converter, a filter and an extender, and these accessories also have optical aberrations. Therefore, when the interchangeable lens with which the accessory is used is attached to the camera, optical aberration data of the accessory should be sent from the interchangeable lens to the camera. Thereby, the optical aberration data to be sent from the interchangeable lens to the camera increases more and more, which makes the time required for data sending longer.

SUMMARY OF THE INVENTION

The present invention provides as one aspect thereof an interchangeable lens apparatus configured to be attachable to a camera and configured to selectively use at least one of a plurality of accessories. The apparatus includes an aberration data memory which stores optical aberration data for each of the accessories, an order data memory which stores sending order data for determining a sending order of the optical aberration data to the camera, a determining part which determines particular optical aberration data, from the optical aberration data stored in the aberration data memory, to be sent to the camera based on information indicating which of a plurality of accessories have been selected for use and which determines the sending order of the particular aberration data based on the sending order data stored in the order data memory, and a transmitting part which sends the particular optical aberration data, determined by the determining part, to the camera in the sending order determined by the determining part.

The present invention provides as another aspect thereof a method of transferring aberration data from an interchangeable lens apparatus to a camera, wherein the interchangeable lens apparatus is configured to selectively use at least one of a plurality of accessories and comprises a memory storing optical aberration data for the respective accessories and sending order data for determining a sending order of the optical aberration data. The method includes the steps of detecting which of the accessories are in use, obtaining optical aberration data and sending order data from the memory corresponding to the detected accessory or accessories, determining the sending order of the obtained optical aberration data based on the obtained sending order data, and sending the obtained optical aberration data, to the camera in the determined sending order.

Other aspects of the present invention will become apparent from the following description and the attached drawings.

DESCRIPTION OF THE PREFERRED EMBODIMENTS

Exemplary embodiments of the present invention will be described hereinafter with reference to the accompanying drawings.

Embodiment 1

Figure 1:
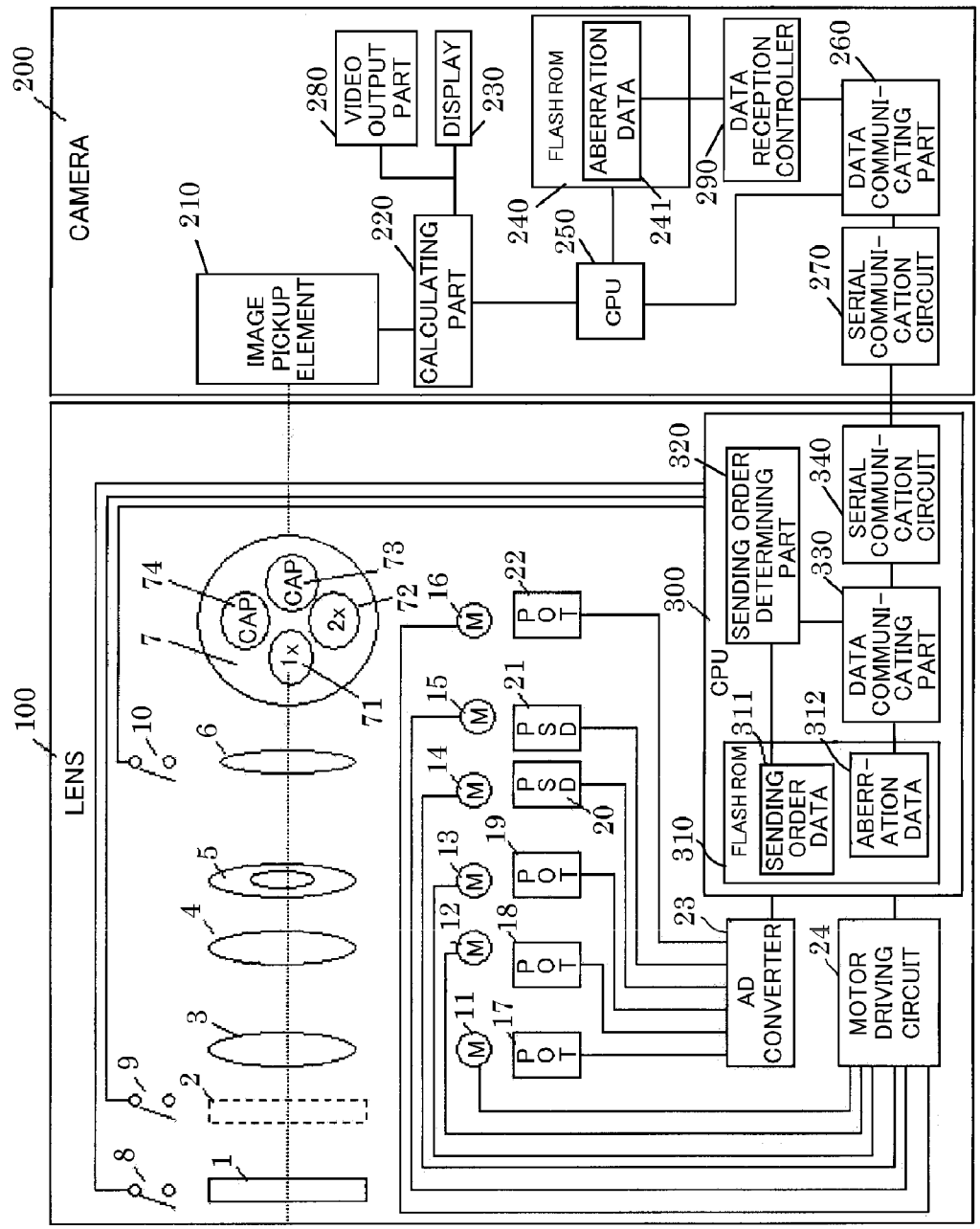
FIG. 1 is a block diagram showing a configuration of a camera system including an interchangeable lens that is Embodiment 1 of the present invention and a camera.

FIG. 1 shows a configuration of a camera system including an interchangeable lens apparatus (hereinafter referred to as "interchangeable lens") that is a first embodiment (Embodiment 1) of the present invention and a camera to which the interchangeable lens is attached.

The interchangeable lens 100 is provided with an image taking optical system constituted by a zoom (magnification varying) lens 4, a focus lens 3, an iris (aperture stop) 5, an image stabilizing lens 6 and an extender turret 7. The image stabilizing lens 6 and a 2× lens, which will be described later and is provided in the extender turret 7, are accessories built into the interchangeable lens 100, and one of them can be selectively used. The "accessories" mean optical members attachable to the interchangeable lens 100 and optical members built into the interchangeable lens 100 to be inserted into an optical path in the interchangeable lens 100 in a state different from a normal (or reference or standard) state. The optical members attachable to the interchangeable lens 100 include, for example, various converters such as a wide converter and a teleconverter which are attachable to an object side end or an image side end of the interchangeable lens 100, and parallel plates such as a polarizing filter. The optical members built into the interchangeable lens 100 to be inserted into the optical path in the state different from the normal state include, for example, an internal extender. Specifically, in the interchangeable lens 100, a 1× (same magnification) lens is inserted into the optical path in the normal state. When a focal length of the interchangeable lens 100 is extended (that is, zooming to a telephoto side is performed), a 2× lens is inserted in the optical path in place of the 1× lens. Aberrations of the interchangeable lens 100 in which the 2× lens is inserted into the optical path are changed from those of the interchangeable lens 100 in which the 1× lens is inserted thereinto. Thus, this embodiment (and other embodiments described later) regards the 2× lens which is a lens different from a lens inserted into the optical path in the reference (normal) state as one of the accessories, but does not regards the 1× lens as one of the accessories. Upon such a definition, the interchangeable lens 100 sends to the camera 200 data of optical aberration generated in the state where the 2× lens is inserted into the optical path and different from optical aberration (basic aberration) generated in the reference state where the 1× lens is inserted into the optical path, in an appropriate sending order described below.

The camera 200 includes an image pickup element 210 photoelectrically converting an object image formed by the image taking optical system to generate image pickup signals of three color channels (G-ch, B-ch and R-ch).

The interchangeable lens 100 is provided with a lens CPU 300 which is a controller controlling the interchangeable lens 100.

The zoom lens 4 is connected with a zoom position sensor (potentiometer) 18 for detecting a position of the zoom lens 4. An analogue signal from the zoom position sensor 18 is converted into a digital signal by an A/D converter 23 to be input to the lens CPU 300. The zoom lens 4 is connected with a zoom motor 12. A motor driving circuit 24 that has received a zoom control signal from the lens CPU 300 controls the zoom motor 12 to move the zoom lens 4 in an optical axis direction.

The focus lens 3 is connected with a focus position sensor (potentiometer) 17 for detecting a position of the focus lens 3. An analogue signal from the focus position sensor 17 is converted into a digital signal by the A/D converter 23 to be input to the lens CPU 300. The focus lens 3 is connected with a focus motor 11. The motor driving circuit 24 that has received a focus control signal from the lens CPU 300 controls the focus motor 11 to move the focus lens 3 in the optical axis direction.

The iris 5 is connected with an iris position sensor (potentiometer) 19 for detecting a position of the iris 5. An analogue signal from the iris position sensor 19 is converted into a digital signal by the A/D converter 23 to be input to the lens CPU 300. The iris 5 is connected with an iris motor 13. The motor driving circuit 24 that has received an iris control signal from the lens CPU 300 controls the iris motor 13 to change an aperture diameter of the iris 5.

The interchangeable lens 100 is provided with an image stabilizing lens detection switch 10 for detecting whether or not the image stabilizing lens 6 is mounted. The lens CPU 300 detects whether or not the image stabilizing lens 6 is mounted (used) according to a signal from the image stabilizing lens detection switch 10. The interchangeable lens 100 is provided with a horizontal PSD sensor 20 which is a position sensor for detecting a horizontal position of the image stabilizing lens 6 and a vertical PSD sensor 21 which is a position sensor for detecting a vertical position of the image stabilizing lens 6. Analogue signals from these PSD sensors 20 and 21 are converted into digital signals by the A/D converter 23 to be input to the lens CPU 300.

The interchangeable lens 100 is provided with a horizontal driving motor 14 and a vertical driving motor 15 for driving the image stabilizing lens 6. The motor driving circuit 24 that has received an image stabilizing control signal from the lens CPU 300 controls the horizontal driving motor 14 and the vertical driving motor 15 to move the image stabilizing lens 6 in a horizontal direction and a vertical direction which are directions orthogonal to the optical axis direction.

The extender turret 7 includes a 1× lens 71, the 2× lens 72 and balancers 73 and 74. The extender turret 7 is rotated to switch a lens disposed (that is, used) on an optical path between the 1× lens 71 and the 2× lens 72. Hereinafter, the extender turret is referred to as "EXT".

The EXT 7 is connected with an EXT position sensor (potentiometer) 22 for detecting a rotation position of the EXT 7. An analogue signal from the EXT position sensor 22 is converted into a digital signal by the A/D converter 23 to be input to the lens CPU 300. The lens CPU 300 detects the lens (one of the 1× lens 71 and the 2× lens 72) to be used based on the digital signal.

The EXT 7 is connected with an extender motor 16. The motor driving circuit 24 that has received an EXT control signal from the lens CPU 300 controls the extender motor 16 to rotate the EXT 7 so as to switch the lens to be used.

In addition, for the interchangeable lens 100, a wide converter 1 and a filter lens 2 (a parallel plate having no refractive power or a plate having a slight curvature) are prepared as accessories selectively attachable (usable), so the wide converter and filter lens 2 may or may not be respectively attached to the interchangeable lens 100. FIG. 1 shows a case where the wide converter 1 is attached and the filter lens 2 is not attached (the location of the filter lens when attached is denoted by the dotted line).

The interchangeable lens 100 is provided with a wide converter detection switch 8 and a filter lens detection switch 9 for detecting whether or not the wide converter 1 and the filter lens 2 are respectively attached to the interchangeable lens 100. The lens CPU 300 detects whether or not the wide converter 1 and the filter lens 2 are attached (used) according to signals from the wide converter detection switch 8 and the filter lens detection switch 9.

The lens CPU 300 contains a memory (flash ROM) 310 serving as an aberration data memory and an order data memory. The memory 310 stores optical aberration data (hereinafter referred to as "aberration data") 312 which are data relating to optical aberrations of the above-mentioned accessories (so the wide converter lens 1, the filter lens 2, the image stabilizing lens 6 and 2× lens 72 of extender turret 7) and sending (transmission) order data 311 used for determining an order in which the aberration data 312 are sent (transmitted) to the camera 200. The memory 310 also stores aberration data relating to optical aberration of the 1× lens 71 of extender turret 7.

The aberration data 312 includes data of longitudinal chromatic aberration (hereinafter referred to as "longitudinal chromatic aberration data), data of chromatic aberration of magnification (hereinafter referred to as "magnification chromatic aberration data"), data of distortion (hereinafter referred to as "distortion data) and the like. For example, the magnification chromatic aberration data is a value showing a shift amount (defocus amount) of the B-ch and R-ch with respect to the G-ch of the image pickup element 210 provided in the camera 200.

The interchangeable lens 100 is provided with a data communicating part 330 which sends the aberration data and data showing positions of the zoom lens 4, the focus lens 3 and the iris 5 (hereinafter referred to as "lens position data") in response to a sending request from the camera 200.

The data communicating part 330 performs serial communication with the camera 200 through a serial communication circuit 340. The lens CPU 300, the data communicating part 330 and the serial communication circuit 340 constitute a transmitting part.

Moreover, the interchangeable lens 300 is provided with a sending order determining part (determining part) 320 that determines, when sending the aberration data 312 to the camera 200, a sending order showing which accessory's aberration data and in what order to send.

The camera 200 is provided with the above-mentioned image pickup element 210 and a camera CPU 250 which is a controller controlling the camera 200. Moreover, the camera 200 is provided with a data communicating part 260 and a serial communication circuit 270 for performing communication with the interchangeable lens 100.

In addition, the camera 200 is provided with a memory (flash ROM) 240 which is a data storing part storing the aberration data 312 and lens position data received from the interchangeable lens 100 and a calculating part 220. The calculating part 220 generates video data (image data) whose aberration is corrected (hereinafter referred to as "aberration-corrected video data") by using aberration data 241 and the lens position data, which have been received from the interchangeable lens 100, stored in the memory 240 and the image pickup signals from the image pickup element 210 to output the aberration-corrected video data to a video output part 280 and/or a display 230 which are provided in the camera 200. As a result, the aberration-corrected video data is output from the camera 200 to an external device such as a monitor and a personal computer, and/or is displayed on the display 230.

For example, the calculating part 220 performs calculation for making the shift amount of the B-ch and R-Ch with respect to the G-ch zero or reducing it by using the magnification chromatic aberration data sent from the interchangeable lens 100 to the camera 200. This calculation enables generation of video data whose chromatic aberration of magnification has been corrected.

Moreover, the camera 200 is provided with a data reception controller 290. The data reception controller 290 confirms whether or not the aberration data 241 stored in the memory 240 is aberration data for the interchangeable lens 100 attached to the camera 200 (or for the accessory used in the interchangeable lens 100), and prevents re-reception of aberration data for the same interchangeable lens 100 (or for the same accessory).

Specifically, the data reception controller 290 checks whether or not aberration data to be newly loaded coincides with the aberration data previously loaded, and does not load the aberration data to be newly loaded if it coincides with the aberration data previously loaded. The check processing may be performed by using an accessory's name (model name) as described later, a header of the aberration data, a part of the aberration data or a combination thereof. The data reception controller 290 may arrange the model names, the headers of the aberration data or the parts of the aberration data in alphabetical order or the like in order to perform the check processing rapidly.

Next, a more detailed description will be made of the aberration data which is sent from the interchangeable lens 100 to the camera 200.

Figure 7:
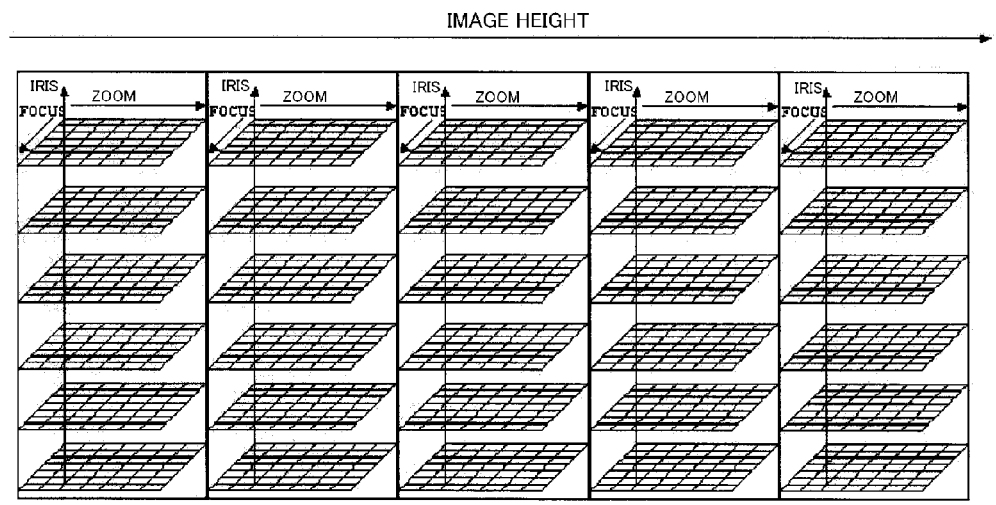
FIG. 7 is a schematic view showing a structure of the aberration data in Embodiment 1.

Parameters of the aberration data for each accessory and for 1× lens 71 include a position of the zoom lens 4 (zoom position [ZOOM]), a position of the focus lens 3 (focus position [FOCUS]), a position of the iris 5 (iris position [IRIS]) and an image height. The image height means a distance (height) from a center in an image. FIG. 7 schematically shows the aberration data. In FIG. 7, each small quadrangle shows a piece of aberration data corresponding to one value (position) of each parameter. FIG. 7 exemplarily shows the aberration data for each accessory (so for one particular accessory) corresponding to seven zoom positions, seven focus positions, six iris positions and five image heights. That is, 1470(=7×7×6×5) pieces of aberration data are provided in total for each accessory.

Therefore, in a case where the accessories available to be selectively used are the image stabilizing lens 6, the wide converter 1 and the EXT 7, the aberration data that should be sent from the interchangeable lens 100 to the camera 200 comprises 5880(=1470×4) pieces of aberration data for the image stabilizing lens 6, the wide converter 1, the 1× lens 71 and the 2× lens 72.

However, it takes a long time to send these whole (all of the 5880 pieces of) aberration data to the camera 200, which causes a long delay until the camera 200 starts aberration correction of a captured image when the camera 200 waits for reception of the whole aberration data after power-on to start the aberration correction.

However, since aberration data that most greatly influences the aberration correction of the captured image among the above-mentioned aberration data is aberration data for the 1× lens 71 (hereinafter referred to as "EXT1× data") in this embodiment, the EXT1× data is defined as basic aberration data of the interchangeable lens 100. In other words, the basic aberration data may be defined as aberration data of the interchangeable lens 100 in a state where no accessories are used (the lens 71 is not regarded as an accessory).

The lens CPU 300 sends the EXT1× data to the camera 200 before sending the aberration data for each of the accessories other than the 1× lens 71 (that is, sending times are separated from each other), and provides a permission of using the aberration data (hereinafter referred to as "aberration data use permission" or "use permission of aberration data") to the camera 200 with completion of sending of the EXT1× data. This enables shortening of a time required for the camera 200 to start the aberration correction, as compared with a case where the camera 200 waits for the reception of the whole aberration data of all accessories to start the aberration correction. The EXT1× data is not subject to a determination of the sending order, and is always sent to the camera 200 first.

Figure 2:
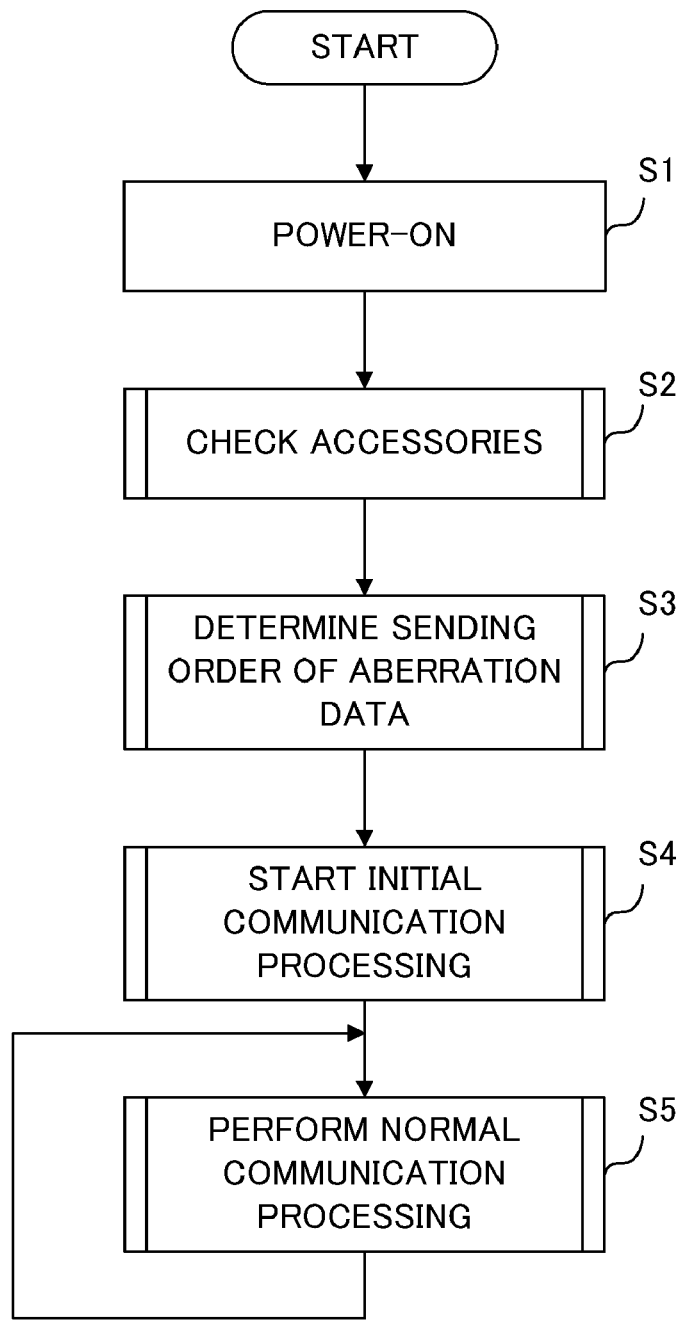
FIG. 2 is a flowchart showing processing from power-on to normal communication in Embodiment 1.

FIG. 2 is a flowchart showing processing performed by the lens CPU 300 from the power-on to the normal communication.

When the power of the camera 200 and the interchangeable lens 100 is turned on, the lens CPU 300 starts this processing at step S1.

At step S2, the lens CPU 300 takes the signals from the wide converter detection switch 8, the filter lens detection switch 9 and the image stabilizing lens detection switch 10 to check whether or not the wide converter 1, the filter lens 2 and the image stabilizing lens 6, which are accessories attachable to the interchangeable lens 100, are being used.

Next, at step S3, the lens CPU 300 determines, based on information showing the accessory or accessories to be used from among the wide converter 1, the filter lens 2 and the image stabilizing lens 6 and the sending order data 311 stored in the memory 310, the sending order of the aberration data. Determination processing of the sending order (sending priority order) will be described later.

Next, at step S4, the lens CPU 300 starts communication with the camera 200 (in particular camera CPU 250) to perform initial communication processing including sending of the EXT1× data. Then, when the initial communication processing is completed, the lens CPU 300 starts at step S5 normal communication processing including sending of the aberration data of the accessories.

Figure 3:
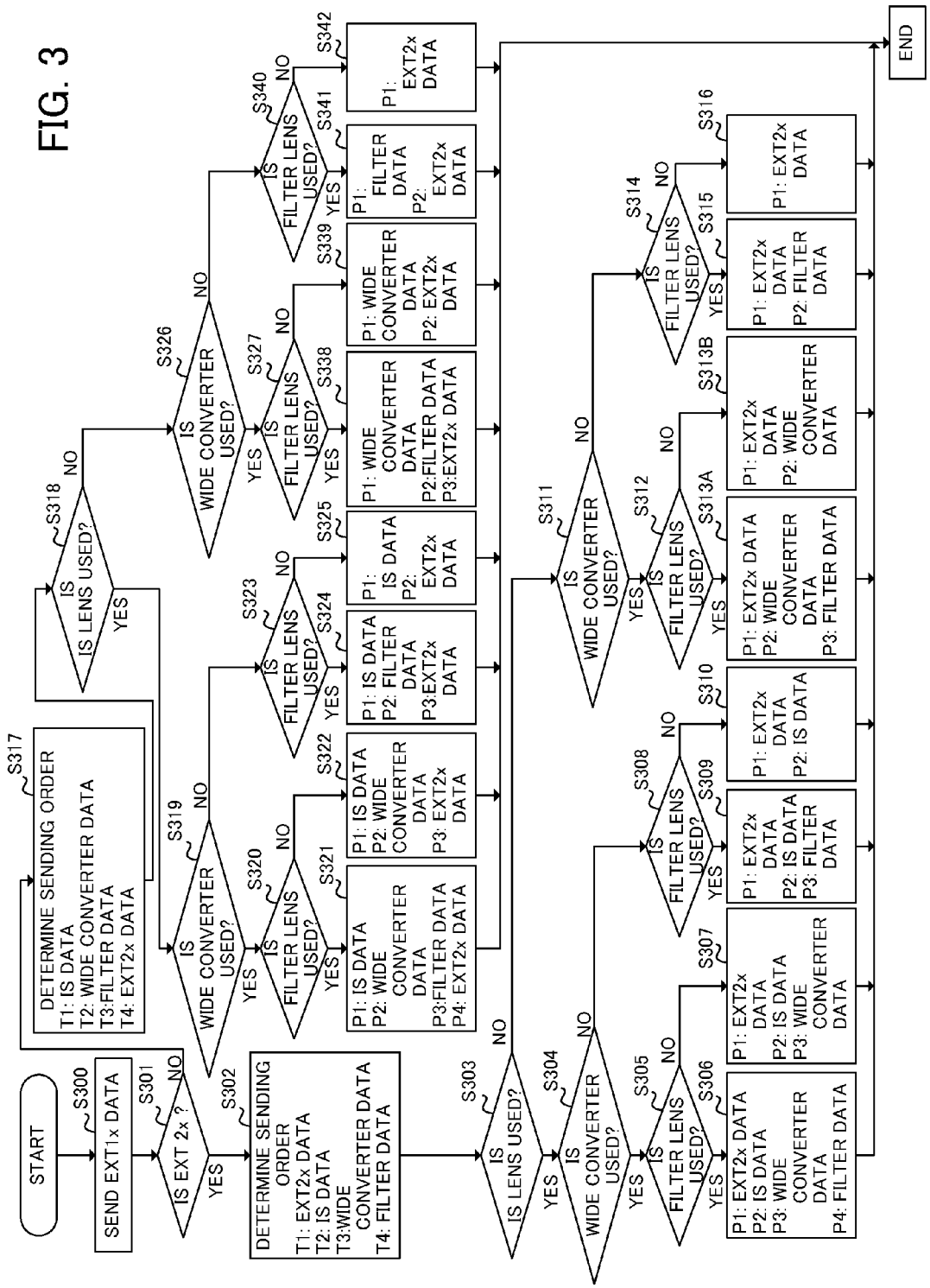
FIG. 3 is a flowchart showing determination processing of a sending order of aberration data in Embodiment 1.

FIG. 3 is a flowchart showing the determination processing of the sending order of the aberration data performed at step S3 in FIG. 2.

The determination of the sending order is performed based on the signals from the wide converter detection switch 8, the filter lens detection switch 9, the image stabilizing lens detection switch 10 and the EXT position sensor 22 and the sending order data 311 stored in the memory 310.

Three aberration data are referred to as A1, A2 and A3 in order from higher to lower sending order in the sending order data 311 stored in the memory 310. Moreover, four aberration data including A1, A2, A3 and the aberration data of the 2× lens 72 (hereinafter referred to as "EXT2× data") are referred to as T1, T2, T3 and T4 in order from higher to lower sending order. In addition, the aberration data T1, T2, T3 and T4 are referred to as P1, P2, P3 and P4 in order from higher to lower sending order determined from the sending order of T1, T2, T3 and T4 and the accessory to be used.

In the sending order data 311 stored in the memory 310, the aberration data for the wide converter 1, the filter lens 2 and the image stabilizing lens (IS) 6 are as follows:

A1: aberration data for the image stabilizing lens 6 (hereinafter referred to as "image stabilizing lens (IS) data");

A2: aberration data for the wide converter 1 (hereinafter referred to as "wide converter data"); and A3: aberration data for the filter lens 2 (hereinafter referred to as "filter data").

Moreover, a description will be made of a case where the wide converter 1 and the image stabilizing lens 6 are attached to (used with) the interchangeable lens 100, and the filter lens 2 is not attached thereto (not used therewith).

At step S300, the lens CPU 300 sends the EXT1× data that is the basic aberration data to the camera 200 to provide the aberration data use permission to the camera 200.

Next, at step S301, the lens CPU 300 (sending order determining part 320) determines whether or not the 2× lens 72 is used in the EXT 7 according to the signal from the EXT position sensor 22. If the 2× lens 72 is not used (that is, the 1× lens 71 is used), the lens CPU 300 proceeds to step S317.

At step S317, the lens CPU 300 reads the sending order data (A1, A2 and A3) 311 from the memory 310 to provisionally determine the sending order of the aberration data as follows. Then, the lens CPU 300 proceeds to step S318.

T1: image stabilizing lens data;
T2: wide converter data;
T3: filter data; and
T4: EXT2× data.

In this embodiment, the sending order of the EXT2× data is determined to be the lowest order when the 2× lens 72 is not used, and to be the highest order when the 2× lens 72 is used.

At step S318, the lens CPU 300 determines whether or not the image stabilizing lens 6 is used according to the signal from the image stabilizing lens detection switch 10. Moreover, at steps S319 and S326, the lens CPU 300 determines whether or not the wide converter 1 is used according to the signal from the wide converter detection switch 8. Further, at steps S320, S323, S327 and S340, the lens CPU 300 determines whether or not the filter lens 2 is used according to the signal from the filter lens detection switch 9. Then, based on the determination results at these steps, the lens CPU 300 determines at steps S321, S322, S324, S325, S338, S339, S341 and S342 aberration data to be actually sent to the camera 200 and the sending order thereof.

In the above-mentioned case where the wide converter 1 and the image stabilizing lens 6 are used and the filter lens 2 is not used, the lens CPU 300 proceeds from step S318, S319 and S320 to step S322 to determine the aberration data to be sent to the camera 200 and the sending order thereof as follows:

P1: image stabilizing lens data;
P2: wide converter data; and
P3: EXT2× data.

On the other hand, when determining that the 2× lens 72 is used at step S301, the lens CPU 300 proceeds to step S302.

At step S302, the lens CPU 300 reads the sending order data (A1, A2, A3) 311 from the memory 310 to provisionally determine the sending order of the aberration data as follows. Then, the lens CPU 300 proceeds to step S303.

T1: EXT2× data;
T2: image stabilizing lens data;
T3: wide converter data; and
T4: filter data.

At step S303, the lens CPU 300 determines whether or not the image stabilizing lens 6 is used according to the signal from the image stabilizing lens detection switch 10. Moreover, at steps S304 and S311, the lens CPU 300 determines whether or not the wide converter 1 is used according to the signal from the wide converter detection switch 8. Further, at steps S305, S308, S312 and S314, the lens CPU 300 determines whether or not the filter lens 2 is used according to the signal from the filter lens detection switch 9. Then, based on the determination results at these steps, the lens CPU 300 determines at steps S306, S307, S309, S310, S313A, S313B, S315 and S316 aberration data to be actually sent to the camera 200 and the sending order thereof.

In the above-mentioned case where the wide converter 1 and the image stabilizing lens 6 are used and the filter lens 2 is not used, the lens CPU 300 proceeds from step S303, S304 and S305 to step S307 to determine the aberration data to be sent to the camera 200 and the sending order thereof as follows:

P1: EXT2× data;
P2: image stabilizing lens data; and
P3: wide converter data.

As described above, the lens CPU 300 determines the aberration data to be sent to the camera 200 and the sending order thereof.

Figure 4:
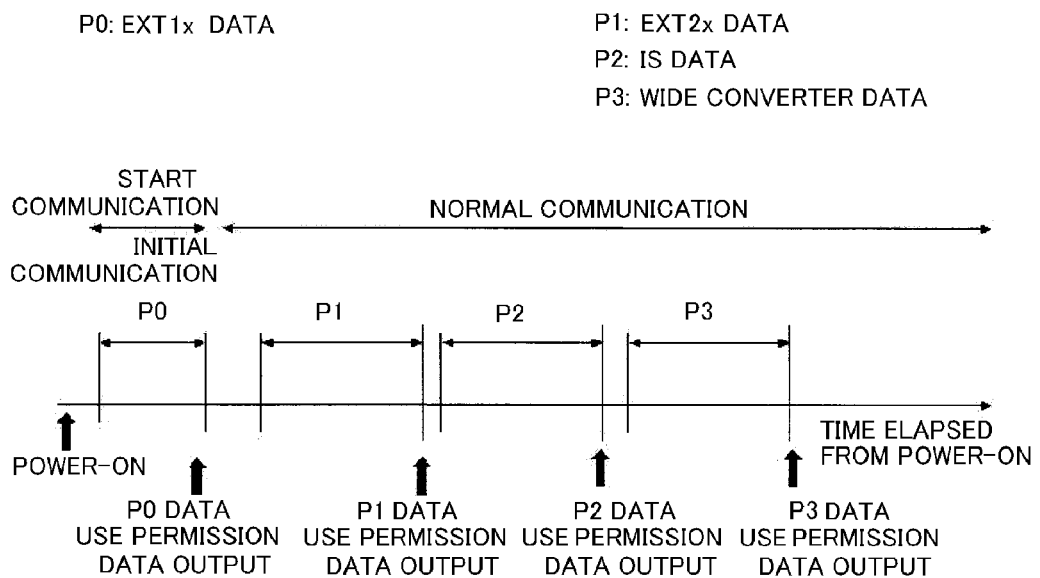
FIG. 4 shows aberration data sending timings in Embodiment 1.

FIG. 4 shows the sending orders of the aberration data to the camera 200 in the initial communication processing performed at step S4 in FIG. 2 and in the normal communication processing performed at step 5 in the same figure. FIG. 4 shows a case where the EXT1× data is sent to the camera 200 in the initial communication processing, and the EXT2× data, the image stabilizing lens data and the wide converter data are sent to the camera 200 in the normal communication processing in the sending order determined at step S307 in FIG. 3. A horizontal axis in FIG. 4 shows time elapsed after the power-on.

The data communicating part 330 provided in the lens CPU 300 first sends the EXT1× data to the camera 200 in the initial communication processing. Then, when the sending of the EXT1× data is completed, the data communicating part 330 sends a permission of using the EXT1× data (P0 data) to the camera 200. The EXT1× data use permission enables the camera 200 to perform the aberration correction using the EXT1× data.

Then, the data communicating part 330 sends the EXT2× data (P1 data), a permission of using the P1 data, the image stabilizing lens data (P2 data), a permission of using the P2 data, the wide converter data (P3 data) and a permission of using the P3 data to the camera 200 in this order. The camera 200 that has received the aberration data of the respective accessories and the aberration data use permissions can perform the aberration correction using those aberration data. For example, the camera 200 that has received the EXT2× data and the EXT2× data use permission can perform the aberration correction using the EXT2× data.

Thus, in this embodiment, before the aberration data of all accessories to be used are sent to the camera 200, the camera 200 can start the aberration correction, and therefore the camera 200 can start the aberration correction in a short time after the power-on.

Figure 5:
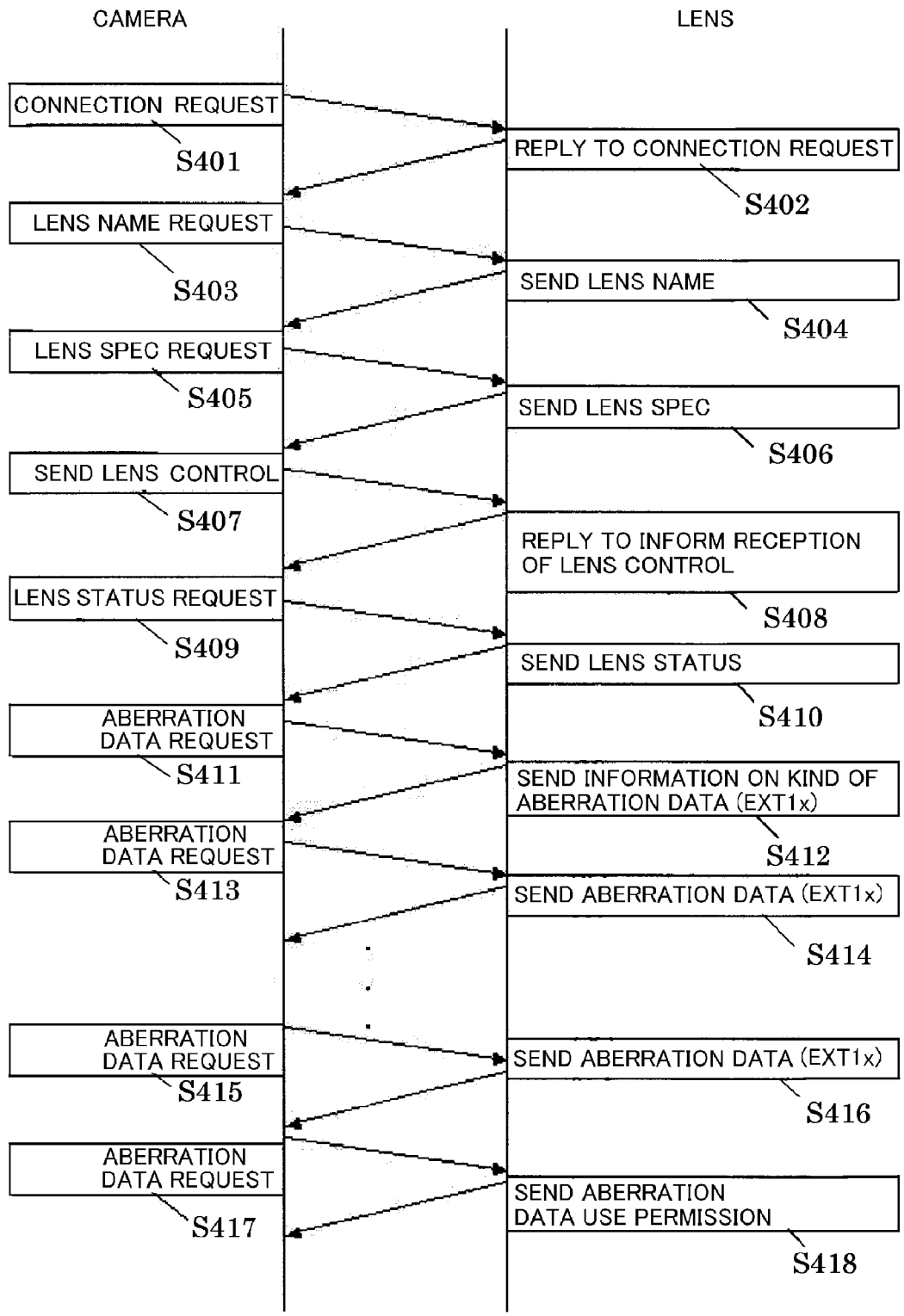
FIG. 5 is a flowchart showing initial communication processing in Embodiment 1.

FIG. 5 shows specific communication contents between the camera 200 (camera CPU 250) and the interchangeable lens 100 (lens CPU 300) in the initial communication processing performed at step S4 in FIG. 2.

The camera 200 and the interchangeable lens 100 communicate with each other by half duplex communication led by the camera 200. The interchangeable lens 100 replies (responds) to instructions or commands sent from the camera 200. The response of the interchangeable lens 100 to the camera 200 is performed once every 16 msec or 20 msec in synchronization with cycles of a vertical synchronizing signal of a video signal.

First at step S401, the camera 200 sends a connection request to the interchangeable lens 100. At step S402, the interchangeable lens 100 sends a reply to the connection request to the camera 200.

Next, at step S403, the camera 200 sends a lens name request to the interchangeable lens 100. At step S404, the interchangeable lens 100 sends its lens name back to the camera 200 as a reply to the lens name request. The camera 200 determines according to the received lens name whether or not the interchangeable lens 100 is the same as that was attached to the camera 200 in the past. The data reception controller 290 prevents re-reception of the aberration data for the interchangeable lens having this lens name.

Next, at step S405, the camera 200 sends a lens specification request to the interchangeable lens 100. At step S406, the interchangeable lens 100 sends its lens specification back to the camera 200. The lens specification includes information on a volume of the aberration data and information on how many (how many kinds of) accessory's aberration data the interchangeable lens 100 has.

The camera 200 secures in the memory 240 a storing region for the aberration data 241 sent from the interchangeable lens 100 according to the volume and number of kinds of the aberration data. The communication at this step S405 and step S406 is performed plural times since the lens specification includes plural items.

Next, at step S407, the camera 200 sends a lens control signal to the interchangeable lens 100. At step S408, the interchangeable lens 100 replies to the camera 200 to inform reception of the lens control signal.

Next, at step S409, the camera 200 sends a lens status data request to the interchangeable lens 100. At step S410, the interchangeable lens 100 sends lens status data back to the camera 200. Since the lens status data includes plural data such as lens position data and magnification information of the EXT 7, the communication at step S409 and step S410 is performed plural times.

Next, at step S411, the camera 200 sends an aberration data request to the interchangeable lens 100. At step S412, the interchangeable lens 100 replies to the camera 200 that the aberration data to be sent thereto next is the EXT1× data.

Then, at step S413, the camera 200 sends an aberration data request to the interchangeable lens 100. At step S414, the interchangeable lens 100 sends the EXT1× data back to the camera 200.

Thereafter, the camera 200 sends aberration data requests plural times to the interchangeable lens 100, and the interchangeable lens 100 sends the EXT1× data in a dividing manner back to the camera 200 (abbreviated by using steps S413 to S416 in FIG. 5).

At step S417, the camera 200 sends an aberration data request to the interchangeable lens 100. At step S418, the interchangeable lens 100 sends a permission of using the entire EXT1× data back to the camera 200 since the sending of the EXT1× data has been completed. The EXT1× data is the basic aberration data of the interchangeable lens 100, so that the use of only the EXT1× data enables generally good aberration correction. Therefore, the interchangeable lens 100 sends to the camera 200 the above-mentioned EXT1× data use permission as a trigger for permitting the camera 200 to start the aberration correction. This enables the camera 200 to start the aberration correction in a short time after the power-on.

Figure 6:
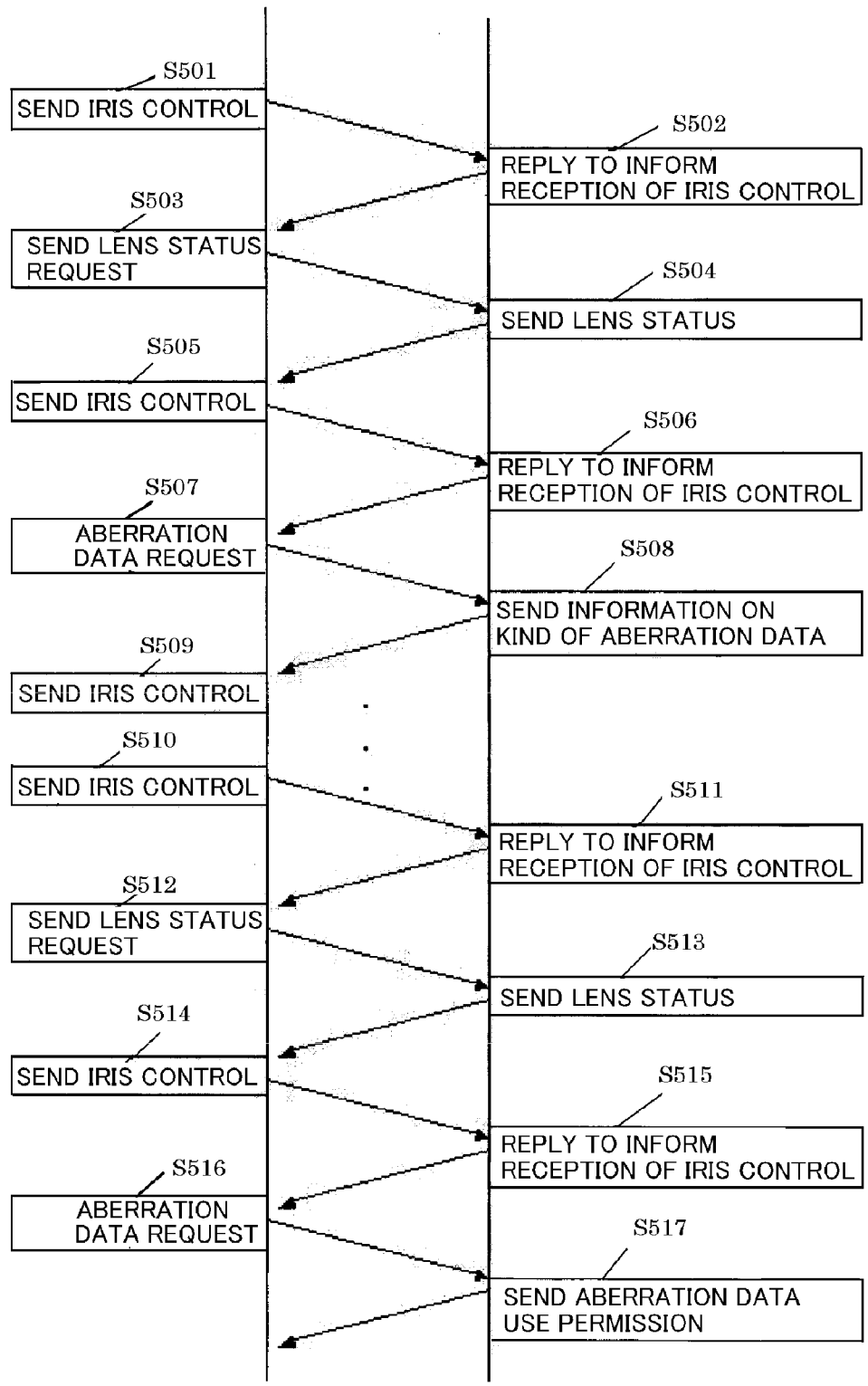
FIG. 6 is a flowchart showing normal communication processing in Embodiment 1.

FIG. 6 shows specific communication contents between the camera 200 (in particular camera CPU 250) and the interchangeable lens 100 (in particular lens CPU 300) in the normal communication processing performed at step S5 in FIG. 2.

In the normal communication processing, at step S501, the camera 200 first sends an iris (IRIS) control signal to the interchangeable lens 100. At step S502, the interchangeable lens 100 replies to the camera 200 to inform reception of the iris control signal.

Next, at step S503, the camera 200 sends the lens status data request to the interchangeable lens 100. At step S504, the interchangeable lens 100 sends the lens status data back to the camera 200. The lens status data includes, as described above, plural data such as lens position data and the magnification information of the EXT 7.

Next, at step S505, the camera 200 sends the iris control signal to the interchangeable lens 100 again. At step S506, the interchangeable lens 100 replies to the camera 200 to inform reception of the iris control signal. The iris control signal is sent again because responsivity of the iris 5 becomes worse if the iris control signal is not updated at short intervals.

Next, at step S507, the camera 200 sends the aberration data request to the interchangeable lens 100. At step S508, the interchangeable lens 100 sends to the camera 200 information on a kind of the aberration data to be first sent according to the sending order of the aberration data determined at step S3 in FIG. 2 (that is, information on the accessory corresponding to the aberration data).

Processing of steps S501 to S508 forms one period where the interchangeable lens 100 sends the aberration data to the camera 200. In the one period, as at steps S411 to S418 in FIG. 5, the interchangeable lens 100 sends to the camera 200, in response to the aberration data requests sent from the camera 200 plural times, information on the kind of the aberration data, the aberration data and the aberration data use permission in this order.

However, timings of sending the aberration data requests from the camera 200 to the interchangeable lens 100 at steps S501 to S508 are different from those in the initial communication processing of FIG. 5. That is, the aberration data request is sent once every four communications including the iris control signal (S501), the lens status data request (S503), the iris control signal (S505) and the aberration data request (S507) in one vertical synchronization period. So in other words, each time four communications from the group including the iris control signal (S501), the lens status data request (S503), the iris control signal (S505) and the aberration data request (S507) are sent within one vertical synchronization period then an aberration data request is sent. Thus, the sending of the aberration data does not occupy (or disturb) the communication between the camera 200 and the interchangeable lens 100, so does not influence the communication function therebetween.

After the sending of the aberration data for one accessory is completed, the aberration data for the next accessory is sent from the interchangeable lens 100 to the camera 200 at step S510 to S517.

Embodiment 2

Figure 9:
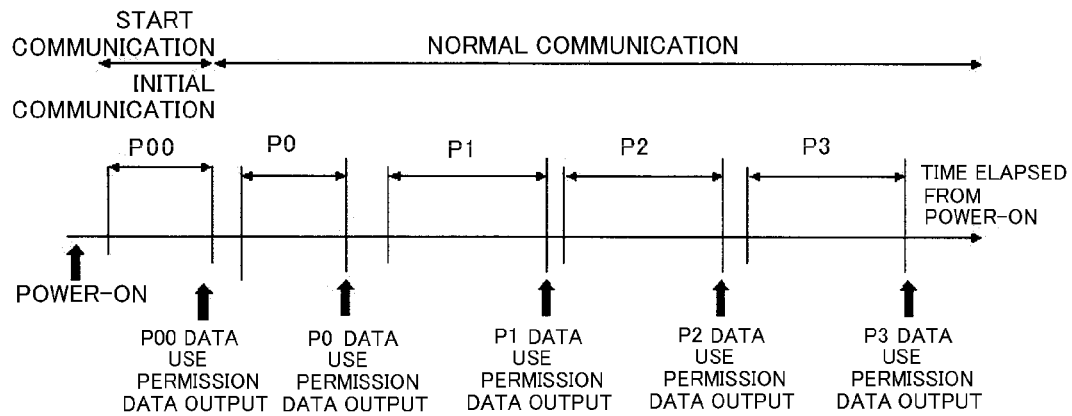
FIG. 9 shows aberration data sending timings in Embodiment 2.

A second embodiment (Embodiment 2) of the present invention will be next described. In this embodiment, as shown in FIG. 9, an interchangeable lens 100 sends EXT1× data to a camera 200 by a method different from that of sending the EXT1× data in the initial communication processing shown in FIG. 4 in Embodiment 1. In FIG. 9, P00-P3 represent the following: P00: EXT1× DATA1; P0: EXT1× DATA2; P1: EXT2× DATA; P2: IS DATA; P3: WIDE CONVERTER DATA.

Specifically, the EXT1× data which is basic aberration data is divided into P00 data and P0 data by the lens CPU 300 (the determining part 320), the P00 data and a use permission thereof are sent in initial communication processing, and the P0 data and a use permission thereof are sent at beginning of normal communication processing.

Otherwise the method of sending data in the initial communication processing and the normal communication processing is the same as that described in FIGS. 5 and 6 in Embodiment 1.

Figure 8:
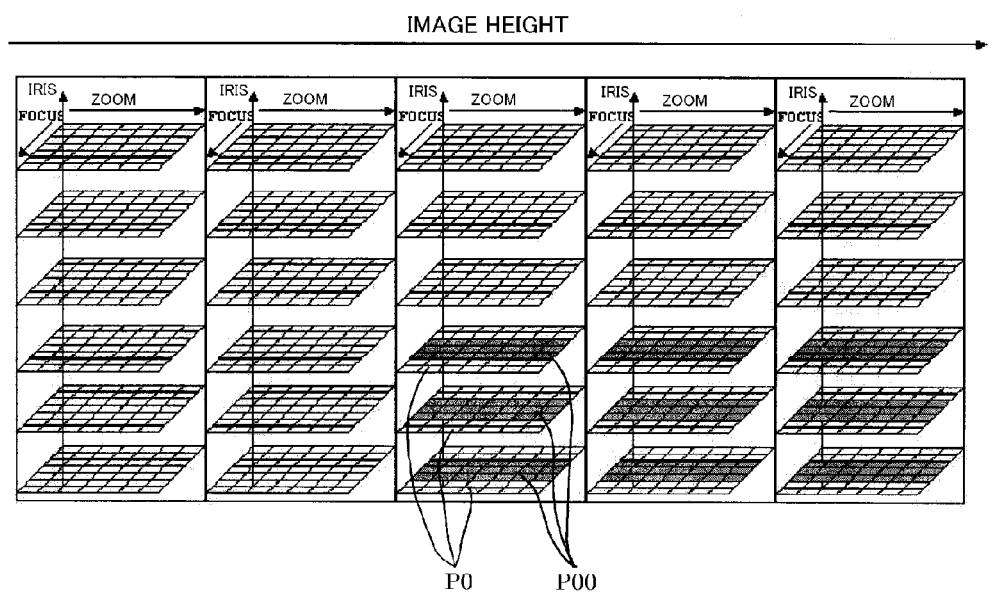
FIG. 8 is a schematic view showing a structure of aberration data in Embodiment 2 of the present invention.

FIG. 8 schematically shows how the EXT1× data is divided into the P00 data and the P0 data. The P00 data is data in a parameter range where aberration is largest, among the EXT1× data, for each parameter so zoom position, focus position, iris position and image height. The P00 data is shown by dark quadrangles (the shaded areas) in FIG. 8. The camera 200 can perform generally good aberration correction by using only the P00 data. The P0 data is data other than the P00 data among the EXT1× data (so the P0 data is the remaining EXT1× data).

In FIG. 8, the P00 data includes in total 189 (=7×3×3×3) pieces of data corresponding to seven zoom positions, three focus positions, three iris positions and three image heights. The P0 data includes 1281 (=1470−189) pieces of data.

As described above, in this embodiment, the interchangeable lens 100 sets the sending order of the P00 data in a specific parameter range where the aberration is largest among the EXT1× data higher than that of the P0 data in a parameter range other than the specific parameter range. So in other words the interchangeable lens 100 (in particular the determining part 320) divides the EXT1× data into two portions, the first portion P00 corresponding to a specific parameter range having a higher aberration and the second portion P0 corresponding to the remaining parameter range, thus having a lower aberration. The "specific parameter range" represents a range of the above-described zoom position, focus position, iris position (aperture diameter) and image height, and may be a range encompassing part of these data. Further, the interchangeable lens 100 provides the P00 data use permission to the camera 200 after sending the P00 data to the camera 200. This enables shortening of a time required for the camera 200 to start the aberration correction after power-on thereof, as compared with a case where the camera 200 waits for reception of the whole aberration data of all accessories to start the aberration correction or even as compared with Embodiment 1 in which the camera waits for reception of all of the EXT1× data before starting aberration correction.

After the sending of the P00 data and the P0 data, the interchangeable lens 100 sends the aberration data for the accessories to the camera 200 according to determined sending order as described in Embodiment 1.

Embodiment 3

Figure 10:
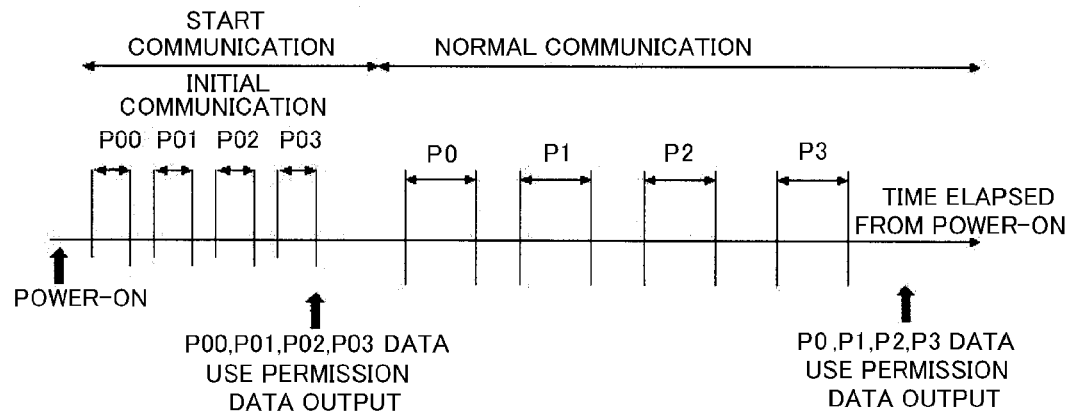
FIG. 10 shows aberration data sending timings in Embodiment 3 of the present invention.

A third embodiment (Embodiment 3) of the present invention will be next described. In this embodiment, as shown in FIG. 10, the number of kinds of aberration data sent from an interchangeable lens 100 to a camera 200 in initial communication processing is increased as compared with Embodiments 1 and 2. In FIG. 10, P00-P3 represent the following: P00: EXT1× DATA1; P0: EXT1× DATA2; P01: EXT2× DATA1; P1: EXT2× DATA2; P02: IS DATA1; P2: IS DATA2; P03: WIDE CONVERTER DATA1; P3: WIDE CONVERTER DATA2.

In this embodiment, in the initial communication processing, the interchangeable lens 100 divides EXT1× data into P00 data and P0 data to send them to the camera 200 as described in Embodiment 2. In addition, in this embodiment, the interchangeable lens 100, in particular the lens CPU 300 (the determining part 320), divides EXT2× data into P01 data and P1 data, divides image stabilizing lens data into P02 data and P2 data, and divides wide converter data into P03 data and P3 data. The meanings of the P01 data, the P02 data and the P03 data are similar to that of the P00 data shown in FIG. 8.

In this embodiment, in the initial communication processing, the interchangeable lens 100 sends to the camera 200 the P00 data, the P01 data, the P02 data and the P03 data. After completion of the sending of the P03 data, the interchangeable lens 100 sends use permissions of these data (so the P00, P01, P02 and P03 data) to the camera 200.

Then, in the normal communication processing, the interchangeable lens 100 sends to the camera 200 the P0 data, the P1 data, the P2 data and the P3 data. After completion of the sending of the P3 data, the interchangeable lens 100 sends use permissions of these data (so the P0, P1, P2 and P3 data) to the camera 200.

In the initial communication processing, the interchangeable lens 100 repeats steps S411 to S416 shown in FIG. 5 in Embodiment 1 to send the P00 data, the P01 data, the P02 data and the P03 data to the camera 200. Next, the interchangeable lens 100, at steps S417 and S418 (of FIG. 5), sends the use permissions of the P00 data, the P01 data, the P02 data and the P03 data to the camera 200.

A data sending method in the normal communication processing is approximately the same as that shown in FIG. 6 in Embodiment 1. However, at steps S516 and S517, the interchangeable lens 100 sends the use permission of the P0 data, the P1 data, the P2 data and the P3 data to the camera 200 after the completion of the sending of the P3 data.

Embodiment 4

Figure 11:
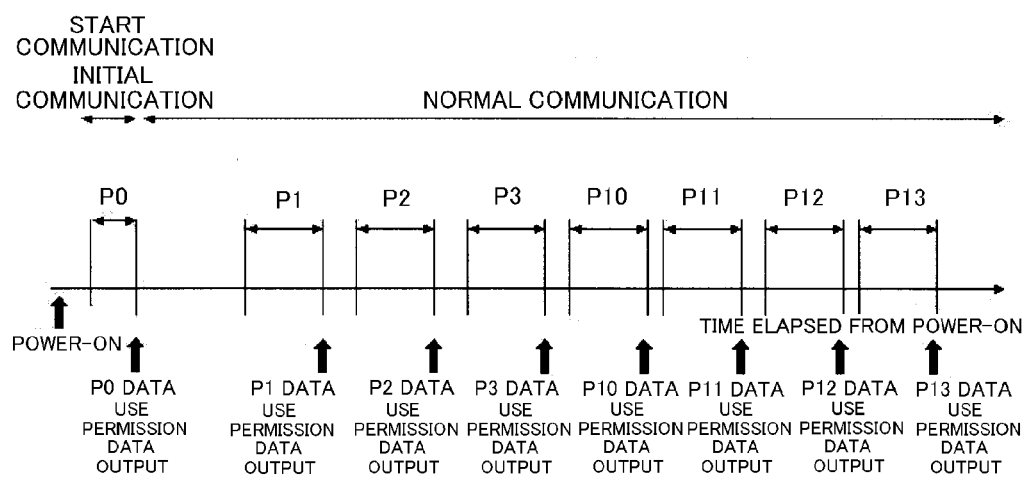
FIG. 11 shows aberration data sending timings in Embodiment 4 of the present invention.

A fourth embodiment (Embodiment 4) of the present invention will be next described. In this embodiment, as shown in FIG. 11, an interchangeable lens 100 (in particular the determining part 320) divides aberration data by kinds of aberration to send the divided aberration data to a camera 200. In FIG. 11, P0-P13 represent the following: P0: MAGNIFICATION CHROMATIC ABERRATION EXT1× DATA; P1: MAGNIFICATION CHROMATIC ABERRATION EXT2× DATA; P2: MAGNIFICATION CHROMATIC ABERRATION IS DATA; P3: MAGNIFICATION CHROMATIC ABERRATION WIDE CONVERTER DATA; P10: DISTORTION EXT1× DATA; P11: DISTORTION EXT2× DATA; P12: DISTORTION IS DATA; P13: DISTORTION WIDE CONVERTER DATA.

In this embodiment, a memory 311 stores, as sending order data 311, sending order data for accessories, so based on accessory type, (first sending order data) and sending order data for kinds of aberration, so based on aberration type, (second sending order data). FIG. 11 shows a case where an image stabilizing lens 6 and a wide converter 1 are accessories to be used, and there are at least two kinds (or a plurality of kinds) of aberration including chromatic aberration of magnification and distortion. Moreover, FIG. 11 shows a case where, as the sending order data for the kinds of aberration, a first order is provided to magnification chromatic aberration data and a second order is provided to distortion data (so the magnification chromatic aberration data is given sending priority over the distortion data).

In this case, the interchangeable lens 100 sends the following aberration data:

P0: magnification chromatic aberration data of EXT1× data to the camera 200 in initial communication processing.

Next, in normal communication processing, the interchangeable lens 100 first sends to the camera 200 the following aberration data in the following order:

P1: magnification chromatic aberration data of EXT2× data,

P2: magnification chromatic aberration data of image stabilizing lens data, and

P3: magnification chromatic aberration data of wide converter data.

Then, the interchangeable lens 100 sends to the camera 200 the following aberration data in the following order:

P10: distortion data of the EXT1× data;

P11: distortion data of the EXT2× data;

P12: distortion data of the image stabilizing lens data; and

P13: distortion data of the wide converter data.

After the sending of each magnification chromatic aberration data and each distortion data, the interchangeable lens 100 sends a use permission thereof to the camera 200.

As described above, in this embodiment, the interchangeable lens 100 sets not only the sending order of the aberration data for each accessory, but also the sending order of the aberration data for each kind of the aberration, and sends the aberration data to the camera 200 in order from one with the highest priority for aberration correction. This enables shortening of a time required for the camera 200 to start the aberration correction after power-on thereof.

This embodiment described the case where there are two kinds of aberration data. However, in a case where there are also other aberration data such as longitudinal chromatic aberration, it is preferable that the highest sending priority aberration data be sent to the camera 200 in the initial communication processing and the other aberration data be sent to the camera 200 in the normal communication processing.

Moreover, this embodiment described the case where the highest sending priority is provided (or allocated) to the magnification chromatic aberration data. However, the highest sending priority may be provided to the longitudinal chromatic aberration data or the distortion data.

As described above, each of the embodiments enables the camera to start the aberration correction in a relatively short time in the case where the interchangeable lens with which the accessories can be used sends the optical aberration data to the camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. In particular, it is also possible to implement a combination of Embodiment 2 or 3 with Embodiment 4.

This application claims the benefit of Japanese Patent Application No. 2009-050005, filed on Mar. 4, 2009, which is hereby incorporated by reference herein in its entirety.

What is claimed is:

1. An interchangeable lens apparatus configured to be attachable to a camera and configured to selectively use at least one of a plurality of accessories, the apparatus comprising:

an aberration data memory which stores optical aberration data for each of the accessories;

an order data memory which stores sending order data for determining a sending order of the optical aberration data to the camera;

a determining part which determines particular optical aberration data, from the optical aberration data stored in the aberration data memory, to be sent to the camera based on information indicating which of plurality of accessories have been selected for use and which determines the sending order of the particular aberration data based on the sending order data stored in the order data memory; and a transmitting part which sends the particular optical aberration data, determined by the determining part, to the camera in the sending order determined by the determining part.

2. An interchangeable lens apparatus according to claim 1, comprising at least one detector which detects which of the plurality of accessories have been selected for use and a controller which obtains the information indicating which of the plurality of accessories have been selected for use based on the detection result of the at least one detector.

3. An interchangeable lens apparatus according to claim 1, wherein the respective optical aberration data for each accessory varies according to a parameter corresponding to a status of the interchangeable lens apparatus.

4. An interchangeable lens apparatus according to claim 3, and wherein the determining part divides the optical aberration data for at least one accessory into at least two portions, the first portion falling within a specific parameter range and the second portion falling outside the specific parameter range, and wherein the determining part gives the first portion a higher sending order than the second portion.

5. An interchangeable lens apparatus according to claim 1, wherein the optical aberration data for each of the accessories contains data of plural kinds of optical aberrations, wherein the order data memory stores a first sending order data set for each of the accessories and a second sending order data set for each kind of optical aberration, and wherein the determining part determines the sending order for each kind of optical aberration based on the first sending order data set and the second sending order data set.

6. An interchangeable lens apparatus according to claim 1, wherein the aberration data memory stores basic aberration data that is optical aberration data of the interchangeable lens apparatus for a state where no accessories are used, and wherein the transmitting part sends the basic aberration data to the camera before sending the optical aberration data for the accessory or accessories.

7. An interchangeable lens apparatus according to claim 6, wherein the basic aberration data (EXT1×) varies according to a parameter corresponding to a status of the interchangeable lens apparatus.

8. An interchangeable lens apparatus according to claim 7, wherein the determining part divides the basic aberration data into at least two portions, the first portion (P00) falling within a specific parameter range and the second portion (P0) falling outside the specific parameter range, and wherein the determining part gives the first portion a higher sending order than the second portion.

9. A camera system comprising:

an interchangeable lens apparatus configured to selectively use at least one of a plurality of accessories; and a camera to which the interchangeable lens apparatus is attachable, wherein the interchangeable lens apparatus comprises:

an aberration data memory which stores optical aberration data for the plurality of accessories;

an order data memory which stores sending order data for determining a sending order of the optical aberration data to the camera;

a determining part which determines particular optical aberration data, from the optical aberration data stored in the aberration data memory, to be sent to the camera based on information indicating which of the plurality of accessories have been selected for use and which determines the sending order of the particular aberration data based on the sending order data stored in the order data memory; and a transmitting part which sends the particular optical aberration data, determined by the determining part, to the camera in the sending order determined by the determining part, and wherein the camera performs aberration correction of a captured image by using the particular optical aberration data sent from the interchangeable lens apparatus.

10. A camera system according to claim 9, wherein the camera comprises:

a data storing part which stores the particular optical aberration data sent from the interchangeable lens apparatus; and a data reception controller which prevents reception of the particular optical aberration data when that particular optical aberration data is already stored in the data storing part.

11. A method of transferring aberration data from an interchangeable lens apparatus to a camera, wherein the interchangeable lens apparatus is configured to selectively use at least one of a plurality of accessories and comprises a memory storing optical aberration data for the respective accessories and sending order data for determining a sending order of the optical aberration data, the method comprising the steps of:

detecting which of the accessories are in use;

obtaining optical aberration data and sending order data from the memory corresponding to the detected accessory or accessories;

determining the sending order of the obtained optical aberration data based on the obtained sending order data; and sending the obtained optical aberration data, to the camera in the determined sending order.

* * * * *